United States Patent
Kimura

(10) Patent No.: US 12,352,381 B2
(45) Date of Patent: Jul. 8, 2025

(54) ASSIST DEVICE

(71) Applicant: Mazda Motor Corporation, Hiroshima (JP)

(72) Inventor: Yoshiaki Kimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 867 days.

(21) Appl. No.: 17/560,257

(22) Filed: Dec. 23, 2021

(65) Prior Publication Data

US 2022/0260205 A1 Aug. 18, 2022

(30) Foreign Application Priority Data

Feb. 12, 2021 (JP) .................... 2021-021286

(51) Int. Cl.
*B25J 18/00* (2006.01)
*F16M 11/10* (2006.01)

(52) U.S. Cl.
CPC .............. *F16M 11/10* (2013.01); *B25J 18/00* (2013.01); *F16M 2200/041* (2013.01)

(58) Field of Classification Search
CPC .... B25J 18/00; F16M 2200/06; A61F 5/0118; A61F 5/013; A61F 2005/0155; A61F 2005/0179; A61H 1/0274
See application file for complete search history.

(56) References Cited

U.S. PATENT DOCUMENTS

| | | |
|---|---|---|
| 2012/0184880 A1 | 7/2012 | Doyle |
| 2014/0158839 A1 | 6/2014 | Doyle |
| 2015/0316204 A1 | 11/2015 | Doyle |
| 2016/0081871 A1 | 3/2016 | Doyle |
| 2016/0363264 A1 | 12/2016 | Doyle |
| 2017/0173783 A1 | 6/2017 | Angold et al. |
| 2018/0028274 A1 | 2/2018 | Doyle |
| 2019/0249825 A1 | 8/2019 | Doyle |
| 2020/0038278 A1 | 2/2020 | Doyle |
| 2020/0253770 A1 | 8/2020 | Doyle |

FOREIGN PATENT DOCUMENTS

| | | | |
|---|---|---|---|
| CN | 105050774 A | | 11/2015 |
| JP | 2014-503320 A | | 2/2014 |
| JP | 2014172129 A | | 9/2014 |
| JP | 2017-512666 A | | 5/2017 |
| JP | 2017-159442 A | | 9/2017 |
| JP | 2018520011 A | * | 7/2018 |

OTHER PUBLICATIONS

Translation of JP2018520011A (Year: 2018).*

* cited by examiner

*Primary Examiner* — Christie Bahena
(74) *Attorney, Agent, or Firm* — XSENSUS LLP

(57) ABSTRACT

An assist device including an upper extremity support capable of detachably supporting an upper extremity of a worker and generating an assist force counteracting a gravitational force acting on the upper extremity. The assist device enables the upper extremity support to move to and be kept outside an area in which work is executable by the upper extremity with an assist being off.

5 Claims, 7 Drawing Sheets

ASSIST DEVICE

CROSS-REFERENCE TO RELATED APPLICATION

The present application claims priority to Japanese application number 2021-021286 filed in the Japanese Patent Office on Feb. 12, 2021, the entire contents of which being incorporated herein by reference.

TECHNICAL FIELD

Embodiments relate to an assist device. In particular, embodiments relate to a wearable assist device that can be worn by a worker.

BACKGROUND ART

In recent years, a technique that allows a worker to wear an assist device and perform work has been actively introduced to reduce workload and improve work environment. The assist device has a function of generating an assist force counteracting a gravitational force acting on an upper extremity such as an arm of a worker, when the upper extremity is supported by an upper extremity supporting portion that is a component of the assist device. This enables the worker to smoothly transport, for example, a heavy object having a relatively heavy weight.

CITATION LIST

Patent Literature

[Patent Literature 1] National Publication of International Patent Application No. 2014-503320
[Patent Literature 2] Japanese Unexamined Patent Publication No. 2017-159442
[Patent Literature 3] National Publication of International Patent Application No. 2017-512666

SUMMARY

Problems to be Solved

Here, the inventor of the present application has newly found that there are some points to be improved in a conventional assist device in the following aspect. Specifically, some work may include, depending on contents and types of work to be performed by a worker, a task that requires the support of the assist force generated by causing the upper extremity supporting portion of the assist device to support an upper extremity such as an arm of the worker (task requiring the assist to be on), and a task that does not require the support of the assist force (task requiring the assist to be off). In the latter task, if the upper extremity supporting portion is present in an area in which the task is executable by the upper extremity, there is a risk that it is rather not easy to smoothly perform the task that does not require the support of the assist force.

Therefore, embodiments are directed to providing an assist device with which a worker can smoothly carry out work as a whole even when the work includes a task that does not require the support of the assist force.

Means for Solving the Problems

One or more embodiments provides an assist device including an upper extremity supporting portion capable of detachably supporting an upper extremity of a worker and generating an assist force counteracting a gravitational force acting on the upper extremity, wherein the assist device enables the upper extremity supporting portion to move to and be kept outside an area in which work is executable by the upper extremity with an assist being off.

According to one or more embodiments, even when work includes a task that does not require the support of the assist force, a worker can smoothly carry out the work as a whole.

BRIEF DESCRIPTION OF DRAWINGS

FIG. 8 is a top view schematically showing a state of the upper extremity supporting portion of the assist device according to one embodiment when the assist is on.
FIG. 10 is a top view schematically showing the first form of the assist device according to one embodiment when the assist is on.
FIG. 11 is a top view schematically showing the difference in the stretched length of elastic members as a component of the assist device according to one embodiment when the assist is on.
FIG. 12 is a detailed top view schematically showing the difference in the stretched length of the elastic members as a component of the assist device according to one embodiment when the assist is on.
FIG. 14 is a top view schematically showing the second form of the assist device according to one embodiment when the assist is on.

DETAILED DESCRIPTION

Figure 1:
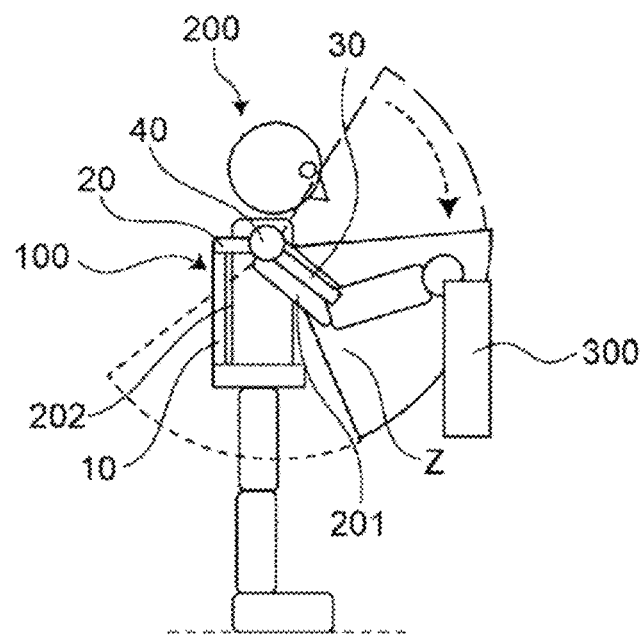
FIG. 1 is a side view schematically showing an assist device according to one embodiment when an assist is on (when transporting a heavy object).

Hereinafter, an assist device according to embodiments is described in more detail with reference to the drawings. Various components in the drawings are merely schematically and exemplary shown to facilitate understanding, and appearance, dimensional ratios, and others may be different in the actual components.
[Basic Configuration of Assist Device]
Before describing characteristic parts of embodiments, an overall configuration of the assist device according to one embodiment is described.

Figure 2:
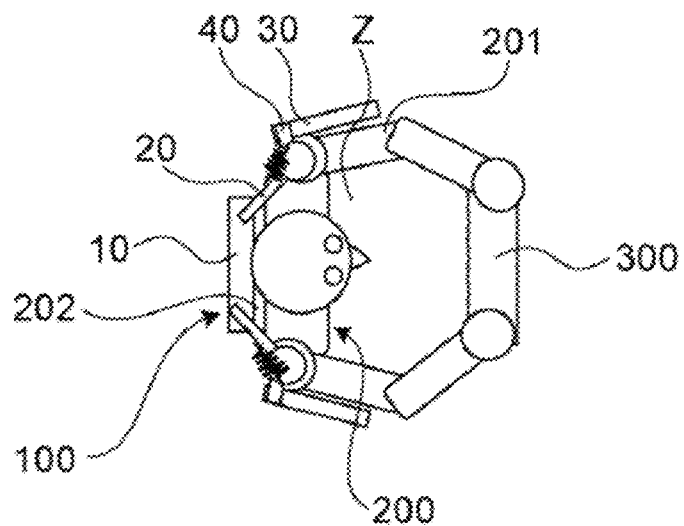
FIG. 2 is a top view schematically showing the assist device according to one embodiment when the assist is on (when transporting the heavy object).
Figure 3:
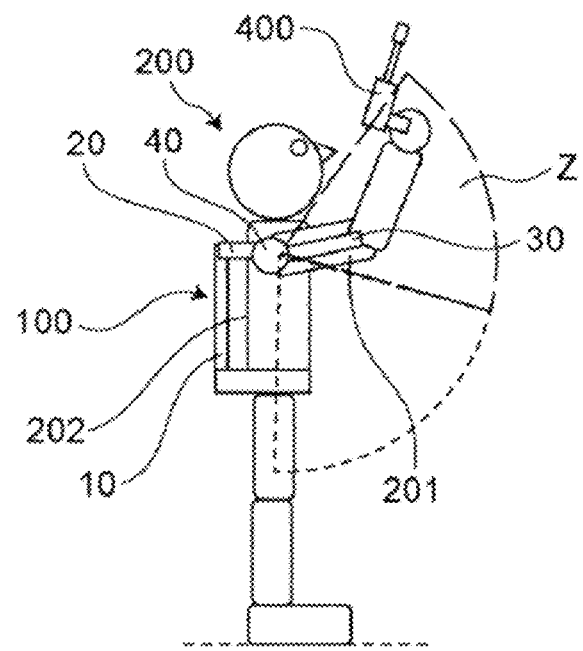
FIG. 3 is a side view schematically showing the assist device according to one embodiment when the assist is on (when working on a high place).
Figure 4:
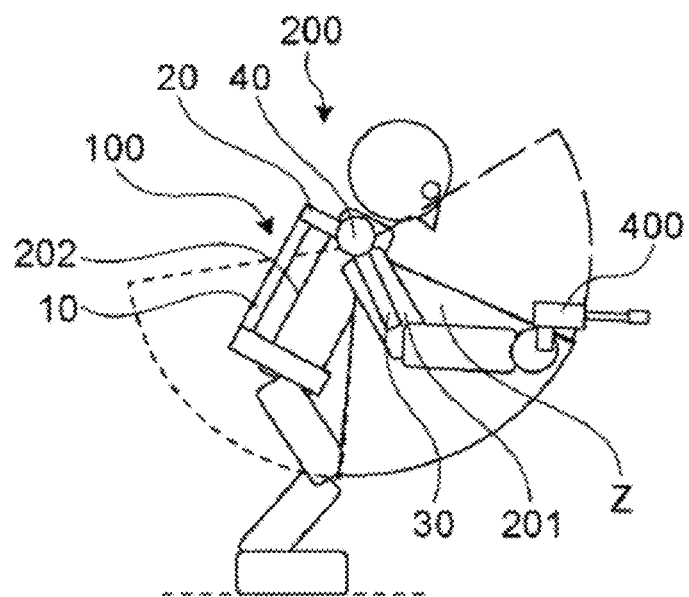
FIG. 4 is a side view schematically showing the assist device according to one embodiment when the assist is on (when working in a stooping posture).

FIG. 1 is a side view schematically showing the assist device according to one embodiment when an assist is on (when transporting a heavy object). FIG. 2 is a top view schematically showing the assist device according to one embodiment when the assist is on (when transporting the heavy object). FIG. 3 is a side view schematically showing the assist device according to one embodiment when the assist is on (when working on a high place, e.g., overhead). FIG. 4 is a side view schematically showing the assist device according to one embodiment when the assist is on (when working in a low place, e.g., a stooping posture).

As shown in FIG. 1 and FIG. 2, an assist device 100 according to one embodiment includes a body 10, a connector, e.g., a connecting portion 20, an upper extremity support, e.g., an upper extremity supporting portion 30, and an axial support, e.g., an axially supporting portion 40.

The body 10 can be worn on a back 202 side of a worker 200, specifically to face the back 202 of the worker 200. The connecting portion 20 is for connecting the body 10 and the upper extremity supporting portion 30. At least one connecting portion 20 is disposed in series and/or in parallel between the body 10 and the upper extremity supporting portion 30.

The upper extremity supporting portion 30 is capable of detachably supporting an upper extremity 201 of the worker 200 and generating an assist force counteracting a gravitational force acting on the upper extremity 201. The upper extremity, in this description, means a part of the worker, including an upper arm, a front arm, and a hand. Specifically, the upper extremity supporting portion 30 has an electric, hydraulic or barometric pressure member, or an elastic member such as a compression spring, therein, and is configured to exert a force on the upper extremity 201 in a substantially opposite direction to the gravitational force acting on the upper extremity 201 when the pressure member or the elastic member supports the upper extremity 201. The axially supporting portion 40 is a portion where the connecting portion 20 and the upper extremity supporting portion 30 are axially supported and connected so as to be rotatable.

The assist device 100 includes the above-mentioned components, and therefore, as shown in FIG. 1 and FIG. 2, when transporting a heavy object 300 having a relatively heavy weight, for example, the heavy object 300 of not less than 15 kg and not more than 20 kg, the worker 200 can smoothly transport the heavy object 300 by causing the upper extremity supporting portion 30 to support the upper extremity 201 and receiving the support of the assist force counteracting the gravitational force acting on the upper extremity 201.

Similarly, as shown in FIG. 3 and FIG. 4, respectively, the worker 200 can smoothly perform work on a high place and work in a stooping posture by receiving, from the assist device 100, the support of the assist force counteracting the gravitational force acting on the upper extremity 201.

The worker 200 can smoothly perform heavy muscular work by receiving, from the assist device 100, the support of the assist force counteracting the gravitational force acting on the upper extremity 201.

[Characteristic Parts]

The characteristic parts are described hereinafter (see FIG. 5 and FIG. 6), based on the premise of the above-described basic configuration of the assist device 100.

Figure 5:
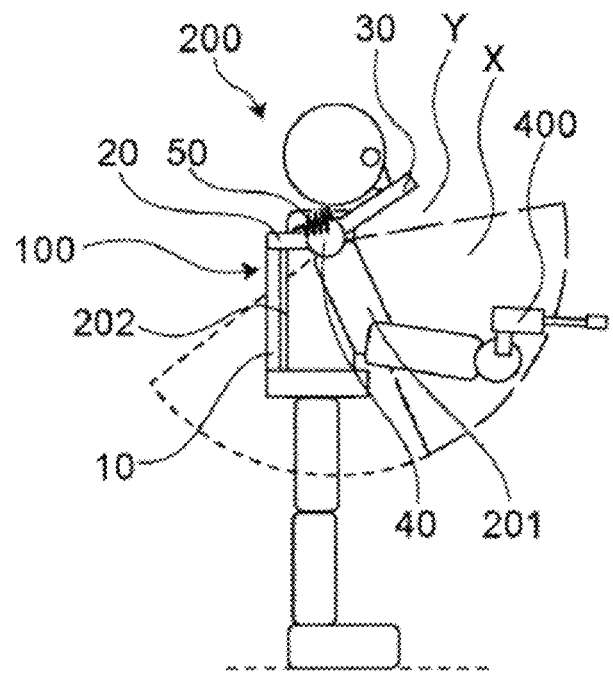
FIG. 5 is a side view schematically showing the assist device according to one embodiment n when the assist is off.
Figure 6:
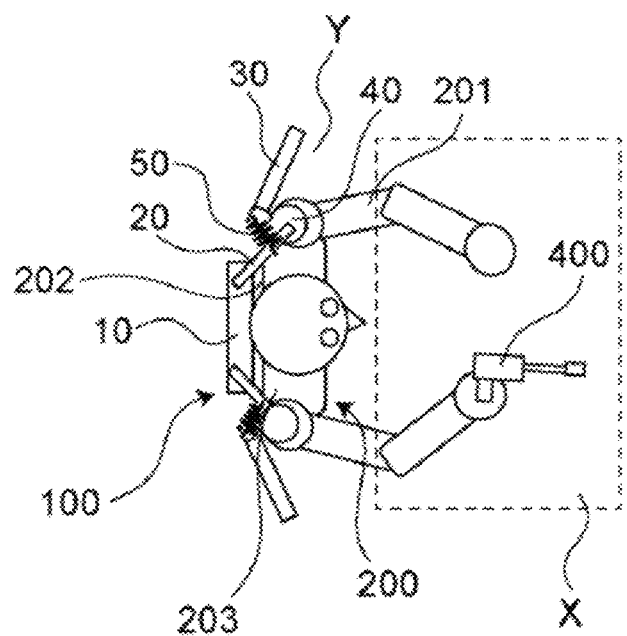
FIG. 6 is a top view schematically showing the assist device according to one embodiment when the assist is off.

FIG. 5 is a side view schematically showing the assist device according to one embodiment when the assist is off. FIG. 6 is a top view schematically showing the assist device according to one embodiment when the assist is off.

As described above, regarding conventional assist devices, some work may include, depending on contents and types of work to be performed by a worker, a task that requires the support of the assist force generated by causing the upper extremity supporting portion of the assist device to support an upper extremity such as an arm of the worker, and a task that does not require the support of the assist force. In the latter task, if the upper extremity supporting portion of the assist device is present in an upper extremity operating area for the task that does not require the support of the assist force, there is a risk that it is difficult to smoothly perform the task that does not require the support of the assist force.

Therefore, the inventor of the present application eagerly studied improvement measures in order to enable a worker to smoothly carry out work as a whole even when the work includes a task that does not require the support of the assist force. As a result, the inventor derived a technical, concept of "causing the upper extremity supporting portion 30 to move to and be kept in an area Y outside an area X in which work is executable by the upper extremity 201 of the worker 200 with the assist being off" as shown in FIG. 5 and FIG. 6. Furthermore, in the present description, "the area X in which work is executable by the upper extremity with the assist being off" means an area in which light-duty work is executable by the upper extremity without receiving assistance of the assist device when the assist is off. In the present description, "the area Y outside the area X in which work is executable by the upper extremity of the worker with the assist being off" means an area excluding the area in which light-duty work is executable by the upper extremity without receiving assistance of the assist device when the assist is off.

According to this technical concept, when the worker 200 performs work with "the assist being off" in the assist device 100, namely work that does not require the support of the assist force (for example, light-duty work, such as screwing work using a tool 400, in a normal posture), the upper extremity supporting portion 30 is not present in the area X in which the work is executable by the upper extremity 201 with the assist being off. In the present description, "light-duty work in a normal posture" means work that can be performed in a posture affected by a relatively small gravitational force compared to a gravitational force acting on the upper extremity during working on a high place and heavy object transportation work.

The same can be said not only for a case where the worker 200 performs a task with "the assist being off" from the beginning of work, but also for a case where the worker 200 performs a task with "the assist being off" after a task with "the assist being on". Specifically, even in this case, it is possible to cause the upper extremity supporting portion 30 to move, from a support position of the upper extremity 201 when the assist is on, to and be kept in the area Y outside the area X in which the work is executable by the upper extremity 201 with the assist being off, and consequently the upper extremity supporting portion 30 is not present in the area X in which the work is executable by the upper extremity 201 with the assist being off.

This makes it possible to avoid interference of the upper extremity supporting portion 30 during work when the assist is off, namely work that does not require the support of the assist force. As a result, even when work includes a task that does not require the support of the assist force, the worker 200 can smoothly carry out the work as a whole.

Furthermore, in one embodiment, it is possible to perform a task with "the assist being on" (for example, work on a high place, heavy object transportation work, or other work, as described above) after a task with "the assist being off". In short, it is possible to change from a state shown in FIG. 5 and FIG. 6 to a state shown in FIG. 1, FIG. 3 or FIG. 4. Specifically, the upper extremity supporting portion 30 supporting the upper extremity 201 can be moved from the area Y outside the area X in which work is executable by the upper extremity 201 with the assist being off to an area Z in which work is executable by the upper extremity with the assist being on. Furthermore, in the present description, "the area Z in which work is executable by the upper extremity with the assist being on" means an area in which heavy muscular work (such as the work on a high place and heavy object transportation work described above) is executable by the upper extremity while receiving assistance of the assist device.

Thus, work with the assist being on can be appropriately carried out with the upper extremity supporting portion 30. Specifically, after the worker 200 performs a task with the assist being off (for example, light-duty work, such as screwing work, in a normal posture) without being interfered with the upper extremity supporting portion 30, the worker 200 can carry out work on a high place, heavy object transportation work, or other work as a task with the assist being on, under the support of the upper extremity supporting portion 30.

From the above, in one embodiment, the upper extremity supporting portion 30 is movable between the area Y outside the area X in which work is executable by the upper extremity 201 with the assist being off and the area Z in which work is executable by the upper extremity 201 with the assist being on. Thus, the worker 200 can carry out each of a task with "the assist being on" (for example, the work on a high place, heavy object transportation work, or other work, as described above) and a task with "the assist being off" (for example, light-duty work, such as screwing work, in a normal posture) at appropriate and necessary timing.

(Forms for Realizing Movement and Keeping of Upper Extremity Supporting Portion 30 when Assist is Off)

Hereinafter, forms for realizing the movement and keeping of the upper extremity supporting portion 30 when the assist is off are described.

Figure 7:
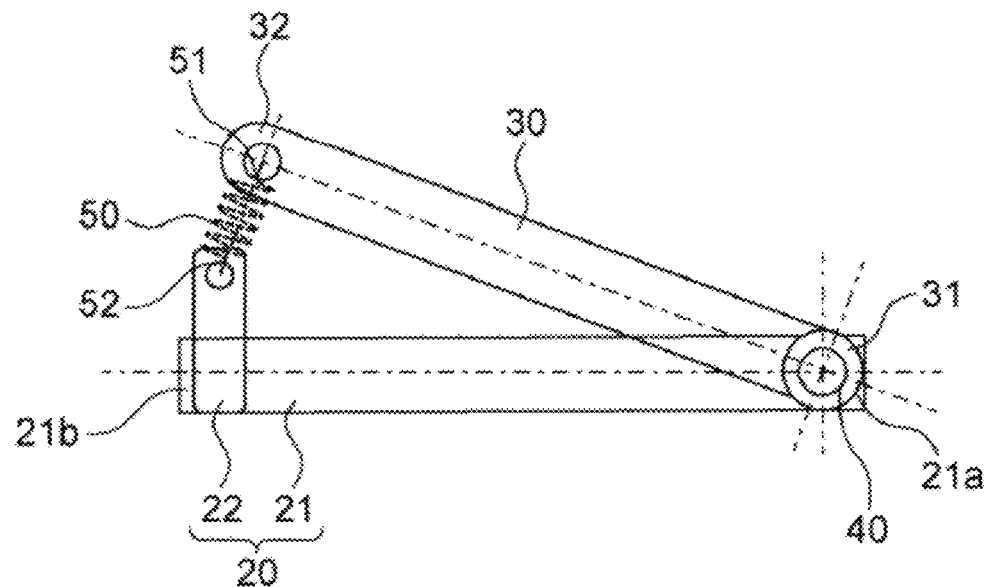
FIG. 7 is a top view schematically showing a state of an upper extremity supporting portion of the assist device according to one embodiment when the assist is off.
Figure 8:
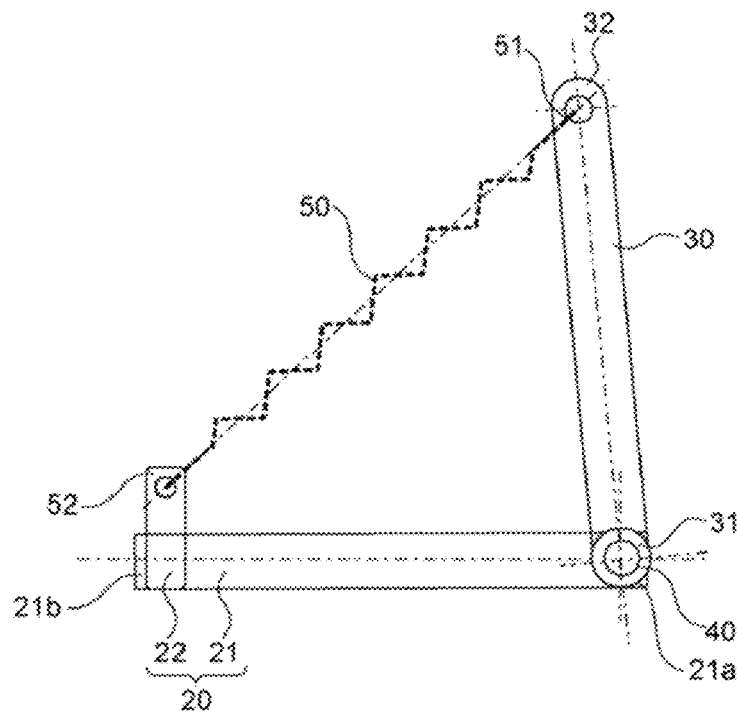

FIG. 7 is a top view schematically showing a state of the upper extremity supporting portion of the assist device according to one embodiment when the assist is off. FIG. 8 is a top view schematically showing a state of the upper extremity supporting portion of the assist device according to one embodiment when the assist is on.

As shown in FIG. 7, in one embodiment, the assist device 100 further includes an elastic member 50 connecting the connecting portion 20 and the upper extremity supporting portion 30, at a portion other than the axially supporting portion 40 for the connecting portion 20 and the upper extremity supporting portion 30 described above. The elastic member 50 may be a tension spring, a rubber member, or the like. Furthermore, in the present description, the elastic member connecting the connecting portion 20 and the upper extremity supporting portion 30 may be denoted as A.

Specifically, as shown in FIG. 7, the connecting portion 20 includes a rail member 21, and a fixed part 22 mounted to the rail member 21 at a second end 21b on the opposite side to the axially supporting portion 40. The axially supporting portion 40 is a portion where a first end 21a of the rail member 21 of the connecting portion and a first end 31 of the upper extremity supporting portion 30 are axially supported and connected so as to be rotatable. The elastic member 50 is configured such that a first end 51 thereof is connected to a second end 32 of the upper extremity supporting portion 30, and a second end 52 thereof is connected to the fixed side part 22.

In one embodiment, the elastic member 50 can urge the upper extremity supporting portion 30 toward the connecting portion 20 when the assist is off. Thus, the upper extremity supporting portion 30 is urged toward the connecting portion 20 by the elastic member 50 when the assist is off, thereby allowing the upper extremity supporting portion 30 to move to and be kept in the area Y outside the area X in which work is executable by the upper extremity 201 with the assist being off (see FIG. 5 and FIG. 6). Consequently, as described above, the worker 200 can carry out work with the assist being off (for example, light-duty work, such as screwing work, in a normal posture), without being interfered with the upper extremity supporting portion 30.

Furthermore, from the viewpoint of appropriately causing the upper extremity supporting portion 30 to move to and be kept in the area Y outside the area X in which work is executable by the upper extremity 201 with the assist being off, the connecting portion 20 located on the side toward which the upper extremity supporting portion 30 is urged may be fixedly disposed outside a working motion area of the upper extremity 201. In one example, from this viewpoint, the connecting portion 20 may be fixedly disposed on a shoulder 203 side of the worker 200 (see FIG. 6). Here, "outside a working motion area of the upper extremity" means an area in which the working motion of the upper extremity does not reach either when the assist is on or when the assist is off.

Alternatively, in order to appropriately urge the upper extremity supporting portion 30 toward the connecting portion 20 when the assist is off, at least first end of the elastic member 50 may be fixedly connected to one of the upper extremity supporting portion 30 and the connecting portion 20. In the form shown in FIG. 7 and FIG. 3, both ends 51, 52 of the elastic member 50 are fixedly connected to the second end 32 of the upper extremity supporting portion 30 and the fixed side part 22 of the connecting portion 20, respectively.

On the other hand, when the assist is on, in order to move the upper extremity supporting portion 30 from "the area Y outside the area X in which work is executable by the upper extremity 201 with the assist being off" to "the area Z in which work is executable by the upper extremity with the assist being on", as shown in FIG. 8, the upper extremity supporting portion 30 is pivoted about the axially supporting portion 40 as a pivot point so as to move away from the connecting portion 20.

Specifically, by causing the upper extremity supporting portion 30 to support the upper extremity 201 and pivotally moving the supported upper extremity 201 to the area Z in which work is executable by the upper extremity with the assist being on, the upper extremity supporting portion 30 can be pivotally moved about the axially supporting portion 40 as the pivot point so as to move away from the connecting portion 20. Consequently, in the area Z in which work is executable by the upper extremity, the worker 200 can perform work with the assist being on (for example, the work on a high place, heavy object transportation work, or other work, as described above).

As described above, the movement and keeping of the upper extremity supporting portion 30 when the assist is off can be realized using the elastic member 50. Regarding this aspect, as described above and as shown in FIG. 7 and FIG. 8, when both the ends 51, 52 of the elastic member 50 are fixedly connected to the second end 32 of the upper extremity supporting portion 30 and the fixed side part 22 of the connecting portion 20, respectively, it is possible to achieve a further improvement in the following point.

Specifically, in an example where a tension spring is used as the elastic member 50 (see FIG. 8), when the assist is on, in order to pivotally move the upper extremity supporting portion 30 from "the area Y outside the area X in which work is executable by the upper extremity 201 with the assist being off" to "the area Z in which work is executable by the upper extremity with the assist being on", the tension spring is stretched.

At this time, if both the ends 51, 52 of the elastic member 50 are fixedly connected to the second end 32 of the upper extremity supporting portion 30 and the fixed side part 22 of the connecting portion 20, respectively, the length of the spring in the stretched state is relatively long, and a tensile force may be relatively large.

As a result, the urging force of the upper extremity supporting portion 30 to the connecting portion 20 is relatively large, and therefore, when the upper extremity is detached from the upper extremity supporting portion 30, the upper extremity supporting portion 30 may pivotally move toward the connecting portion 20 with excessive momentum due to characteristics thereof. In particular, when the connecting portion 20 is fixedly disposed on the shoulder 203 side of the worker 200, the urging force toward the shoulder 203 of the worker is relatively large, and consequently the burden on the shoulder 203 of the worker may become larger.

In considering this fact, from a viewpoint of reducing the burden on the worker, to relatively reduce the tensile force of the tension spring that is stretched when the assist is on.

The inventor of the present application also eagerly studied forms to reduce the tensile force of the tension spring when the assist is on. As a result, the inventor of the present application has further found anew the following two forms, described hereinafter.

(First Form)

In the first form, an example where a first end 51A of an elastic member 50A is fixed to the upper extremity supporting portion 30 is presented. Without limiting to this, it is also possible to adopt a form in which a first end of the elastic member 50A is fixed to the connecting portion 20.

Figure 9:
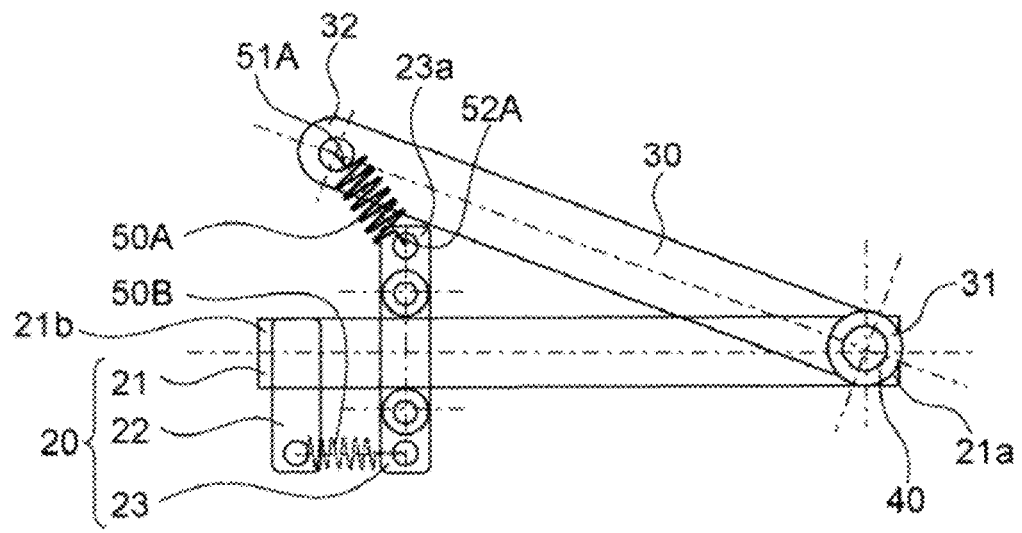
FIG. 9 is a top view schematically showing a first form of the assist device according to one embodiment when the assist is off.
Figure 10:
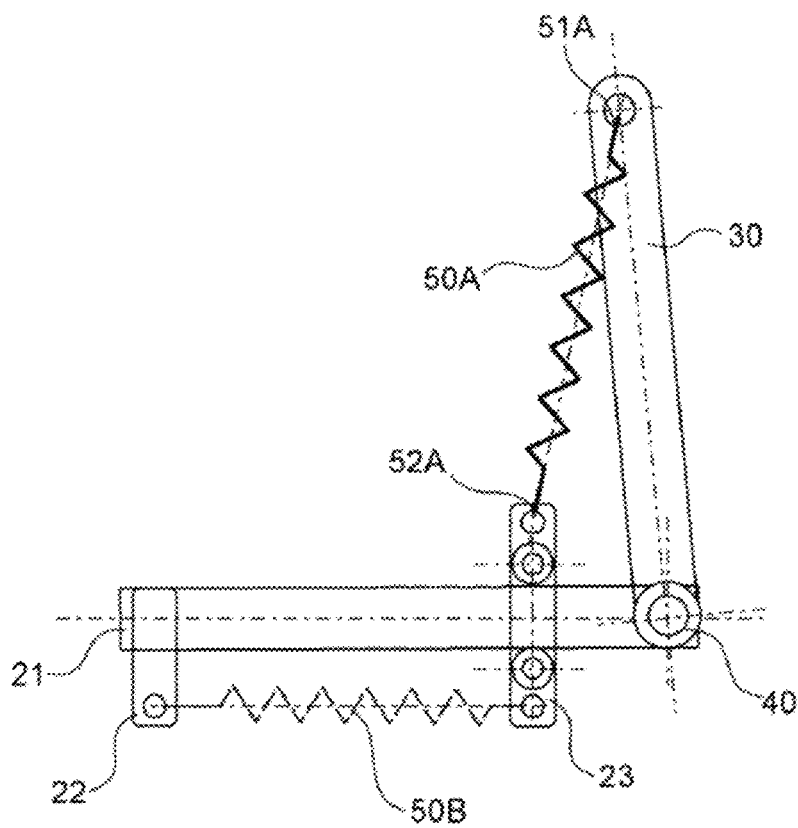
Figure 11:
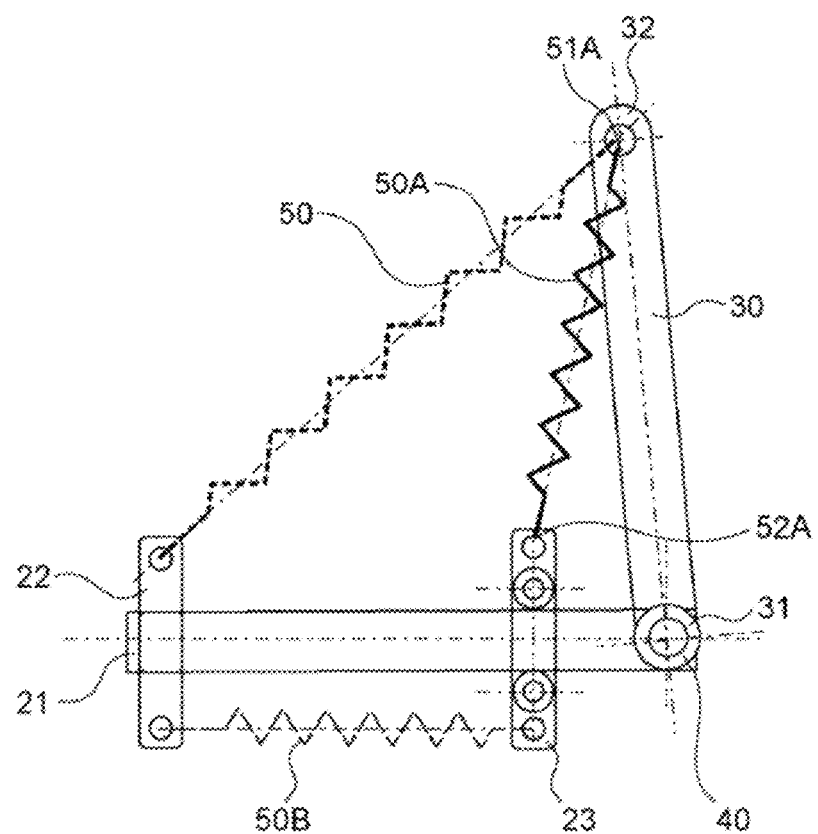
Figure 12:
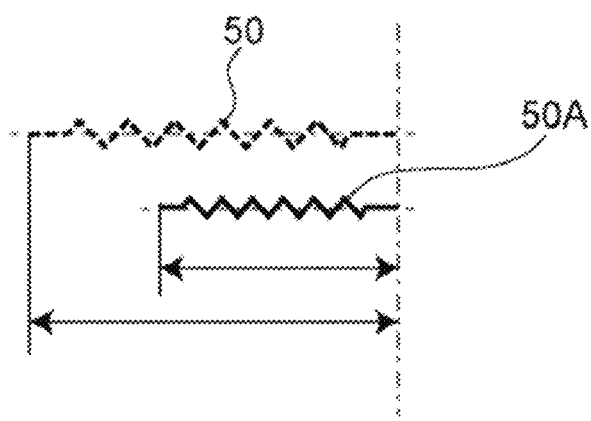

FIG. 9 is a top view schematically showing the first form of the assist device according to one embodiment when the assist is off. FIG. 10 is a top view schematically showing the first form of the assist device according to one embodiment when the assist is on. FIG. 11 is a top view schematically showing the difference in the stretched length of the elastic members as a component of the assist device according to one embodiment when the assist is on. FIG. 12 is a detailed top view schematically showing the difference in the stretched length of the elastic members as a component of the assist device according to one embodiment when the assist is on.

In one form, when the upper extremity supporting portion 30 is pivotally moved about the axially supporting portion 40 as the pivot point, the position of the second end 52A of the elastic member 50A may be changeable on the connecting portion 20 to approach the axially supporting portion 40. Furthermore, in a form in which the first end of the elastic member 50A is fixed to the connecting portion 20, the position of the second end of the elastic member 50A may be changeable on the upper extremity supporting portion 30 to approach the axially supporting portion 40.

As one example, in the form of FIG. 9 compared with the form of FIG. 7, the connecting portion 20 includes: the rail member 21; the fixed part 22; a movable part 23; and an elastic member 50B (which may also be denoted as B) connecting the fixed part 22 and the movable part 23.

The fixed part 22 is mounted on the rail member 21 at the second end 21b on the opposite side to the axially supporting portion 40. The movable part 23 is mounted on the rail member 21 so as to be movable between the fixed part 22 and the axially supporting portion 40. The elastic member 50A is equivalent to the elastic member 50 shown in FIG. 7, and is configured such that the first end 51A thereof is connected to the second end 32 of the upper extremity supporting portion 30, and the second end 52A is connected to the movable part 23.

Moreover, the elastic member 50A can urge the upper extremity supporting portion 30 toward the movable part 23 of the connecting portion 20 when the assist is off. The elastic member 50B can urge the movable part 23 toward the fixed part 22 when the assist is off. The elastic members 50A, 50B may be tension springs, rubber members, or the like.

When the assist is off, the elastic member 50A is not in a stretched state due to the above-mentioned characteristics of the elastic member 50A, and therefore the second end 32 of the upper extremity supporting portion 30 and an end 23a of the movable part 23 are in close proximity to each other. Similarly, since the elastic member 50B is not in a stretched state due to the above-mentioned characteristics of the elastic member SOB, the fixed part 22 and the movable part 23 are in close proximity to each other. Thus, the upper extremity supporting portion 30 can be moved to and kept in the area Y outside the area X in which work is executable by the upper extremity 201 with the assist being off (see FIG. 5 and FIG. 6).

On the other hand, when the assist is on, by causing the upper extremity supporting portion 30 to support the upper extremity 201 and pivotally moving the supported upper extremity 201 to the area Z in which work is executable by the upper extremity with the assist being on, the upper extremity supporting portion 30 can be pivotally moved about the axially supporting portion 40 as the pivot point so as to move away from the connecting portion 20 as shown in FIG. 10.

At this time, in the present form, since the first end 51A of the elastic member 50A is connected to the second end 32 of the upper extremity supporting portion 30 and the second end 52A is connected to the movable part 23, when the upper extremity supporting portion 30 is pivotally moved about the axially supporting portion 40 as the pivot point, the movable part 23 connected to the second end 52A of the elastic member 50A can change the position thereof on the connecting portion 20 so as to approach the axially supporting portion 40. Accordingly, the elastic member 50B having the first end connected to the movable part 23 is stretched.

Consequently, as shown in FIG. 11 and FIG. 12, the length of the spring in the stretched state of the elastic member 50A may be relatively short compared to the case where both the ends 51, 52 of the elastic member 50 are fixedly connected to the second end 32 of the upper extremity supporting portion 30 and the fixed side part 22 of the connecting portion 20, respectively (see FIG. 7 and FIG. 8). As a result, it is possible to relatively reduce the tensile force of the tension spring that is stretched when the assist is on. It should be noted that this case is based on an assumption that the elastic member 50 and the elastic member 50A shown in FIG. 11 and FIG. 12 have the same spring constant.

(Second Form)

In a second form, an example where a first end 51C of an elastic member 50C is fixed to the connecting portion 20 is presented. Without limiting to this, it is also possible to adopt a form in which the first end of the elastic member 50C is fixed to the upper extremity supporting portion 30.

Figure 13:
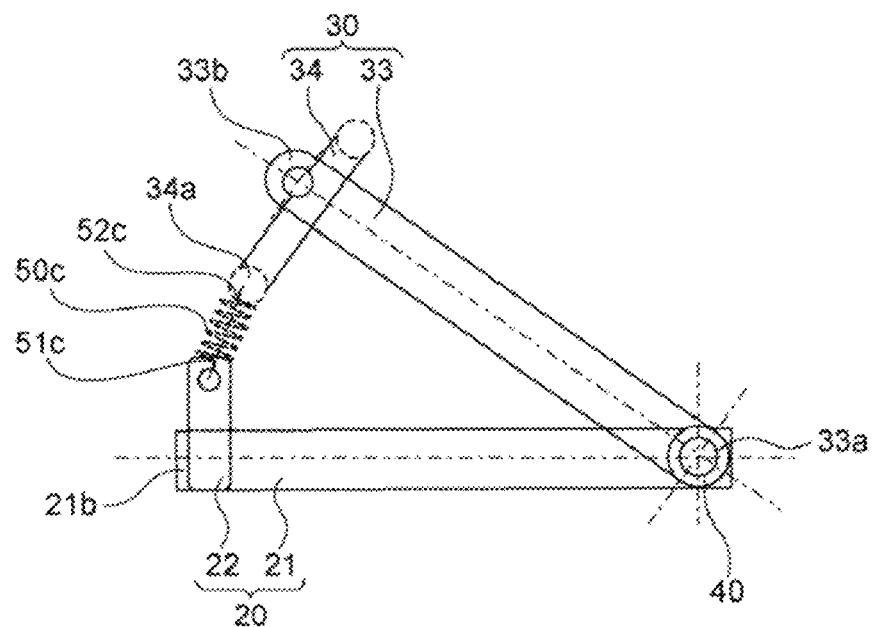
FIG. 13 is a top view schematically showing a second form of the assist device according to one embodiment when the assist is off.
Figure 14:
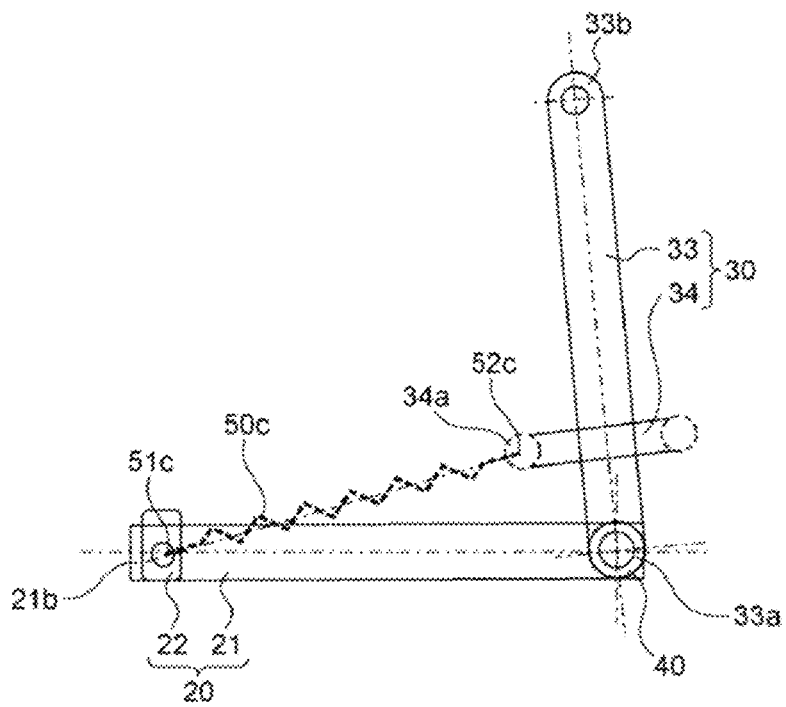

FIG. 13 is a top view schematically showing the second form of the assist device according to one embodiment when the assist is off. FIG. 14 is a top view schematically showing the second form of the assist device according to one embodiment when the assist is on.

In one form, the upper extremity supporting portion 30 may further include a sliding member 34 slidable in the longitudinal direction, and the second end 52C of the elastic member 50C be attached to the sliding member 34. Furthermore, in the case where one end of the elastic member 50C is fixed to the upper extremity supporting portion 30, the connecting portion 20 further include a sliding member slidable in the longitudinal direction, and the second end 52C of the elastic member 50C be attached to the sliding member.

As one example, in the form of FIG. 13, the connecting portion 20 includes the rail member 21 and the fixed part 22. The upper extremity supporting portion 30 includes a link member 33 and the sliding member 34. The fixed part 22 is mounted on the rail member 21 at the second end 21b on the opposite side to the axially supporting portion 40. The sliding member 34 is configured to be slidable between both ends 33a, 33b of the link member 33, and is configured to be placeable on the second end 33b of the link member 33, on the opposite side to the axially supporting portion 40, when the assist is off. Moreover, the elastic member 50C can urge the upper extremity supporting portion 30 toward the fixed part 22 of the connecting portion 20 when the assist is off. The elastic member 50C may be a tension spring, a rubber member, or the like.

When the assist is off, the elastic member 50C is not in a stretched state due to the above-mentioned characteristics of the elastic member 50C, and therefore an end 34a of the sliding member 34 to which the second end 52C of the elastic member 50C is attached and the fixed part 22 to which the first end 51C of the elastic member 50C is attached are in close proximity to each other. Thus, the upper extremity supporting portion 30 can be moved to and kept in the area Y outside the area X in which work is executable by the upper extremity 201 with the assist being off (see FIG. 5 and FIG. 6).

On the other hand, when the assist is on, by causing the upper extremity supporting portion 30 to support the upper extremity 201 and pivotally moving the supported upper extremity 201 to the area Z in which work is executable by the upper extremity with the assist being on, the upper extremity supporting portion 30 can be pivotally moved about the axially supporting portion 40 as the pivot point so as to move away from the connecting portion 20 as shown in FIG. 14.

In the present form, the first end 51C of the elastic member 50C is attached to the fixed part 22, and the second end 52C of the elastic member 50C is attached to the sliding member 34 which is slidable between both ends 33a, 33b of the link member 33. Therefore, when the upper extremity supporting portion 30 is pivotally moved about the axially supporting portion 40 as the pivot point, the sliding member 34 disposed on the second end 33b of the link member 33 on the opposite side to the axially supporting portion 40 when the assist is off can change the position thereof on the link member 33 so as to approach the axially supporting portion 40.

Consequently, as shown in FIG. 14, the length of the spring in the stretched state of the elastic member 50C may be relatively short compared to the case where both the ends 51, 52 of the elastic member 50 are fixedly connected to the second end 32 of the upper extremity supporting portion 30 and the fixed side part 22 of the connecting portion 20, respectively (see FIG. 7 and FIG. 8). As a result, it is possible to relatively reduce the tensile force of the tension spring that is stretched when the assist is on. It should be noted that this is based on an assumption that the elastic member 50C shown in FIG. 13 and FIG. 14 and the elastic member 50 shown in FIG. 7 and FIG. 8 have the same spring constant.

From the above, in both of the first form and the second form, the urging force of the upper extremity supporting portion 30 toward the connecting portion 20 can be made relatively small by reducing the tensile force of the tension spring that is stretched when the assist is on. Hence, when the upper extremity is detached from the upper extremity supporting portion 30, the upper extremity supporting portion 30 can pivotally move toward the connecting portion 20, without excessive momentum, due to characteristics thereof. As a result, even when the connecting portion 20 is fixedly disposed on the shoulder 203 side of the worker 200, the urging force toward the shoulder 203 of the worker is relatively small, and the burden on the shoulder 203 of the worker can be reduced (see FIG. 6).

Furthermore, embodiments are shown as examples are not limited thereto, and various modifications and design changes may be made within the scope without departing from the of the present description.

INDUSTRIAL APPLICABILITY

The assist device 100 according to one or more embodiments can be used suitably in assembling automobiles.

REFERENCE SIGNS LIST

100 Assist device
10 Body
20 Connecting portion
21 Rail member
21a first end of rail member
21b second end of rail member
22 Fixed part
23 Movable part
30 Upper extremity supporting portion
31 First end of upper extremity supporting portion
32 Second end of upper extremity supporting portion
33 Link member
33a First end of link member
33b Second end of link member
34a End of sliding member
40 Axially supporting portion
50, 50A, 50B, 50C Elastic member
51, 51A, 51C First end of elastic member
52, 52A, 52C Second end of elastic member
200 Worker
201 Upper extremity of worker
202 Back of worker
203 Shoulder of worker
300 Heavy object
400 Tool X Area in which work is executable by an upper extremity of a worker with the assist being off
Y Area outside area X in which work is executable by an upper extremity of a worker with the assist being off
Z Area in which work is executable by the upper extremity with the assist being on

The invention claimed is:

1. An assist device, comprising:
an upper extremity support capable of detachably supporting an upper extremity of a worker and generating an assist force counteracting a gravitational force acting on the upper extremity,
a body attachable to a back side of the worker;
at least one connector connecting the body and the upper extremity support;
an axial support; and
a first elastic member, wherein
 the connector and the upper extremity support are supported by the axial support to be rotatable,
 the connector and the upper extremity support are connected through the first elastic member at a position other than the axial support, and
 the first elastic member urges the upper extremity support towards the connector when the assist is off,
the assist device enables the upper extremity support to move to and be kept outside an area in which work is executable by the upper extremity with an assist being off,
at least a first end of the first elastic member is fixed to a first one of the first upper extremity support or the connector,
when the upper extremity support is pivotally moved about the axial support as a pivot point, a position of a second end of the first elastic member is changeable on a second upper extremity support and the connector to approach the axial support, and
a second one of the upper extremity support or the connector further includes a fixed part, a movable part, and a second elastic member connecting the fixed part and the movable part, and the second end of the first elastic member is attached to the movable part.

2. The assist device according to claim 1, wherein the second one of the upper extremity support or the connector further includes a sliding member slidable in a longitudinal direction of the second one of the upper extremity support and the connector, and the second end of the first elastic member is attached to the sliding member.

3. The assist device according to claim 1, wherein work to be performed with the assist being off is lighter than work with the assist being on.

4. The assist device according to claim 3, wherein work to be performed with the assist is heavier than work with the assist being off, wherein heavier work is at least one of work overhead or work of transporting a heavy object of not less than 15 kg and not more than 20 kg, to be performed by the worker.

5. The assist device according to claim 1, wherein the assist device is used for assembling automobiles.

* * * * *